(12) United States Patent
Ionescu et al.

(10) Patent No.: US 10,979,443 B2
(45) Date of Patent: *Apr. 13, 2021

(54) AUTOMATIC TRAFFIC CLASSIFICATION OF WEB APPLICATIONS AND SERVICES BASED ON DYNAMIC ANALYSIS

(71) Applicant: International Business Machines Corporation, Armonk, NY (US)

(72) Inventors: Paul Ionescu, Ontario (CA); Jason David Keirstead, Fredericton (CA); Iosif Onut, Ottawa (CA); Douglass J. Wilson, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/585,053

(22) Filed: Sep. 27, 2019

(65) Prior Publication Data

US 2020/0028869 A1 Jan. 23, 2020

Related U.S. Application Data

(63) Continuation of application No. 15/854,057, filed on Dec. 26, 2017, now Pat. No. 10,542,025.

(51) Int. Cl.
*H04L 29/06* (2006.01)
*H04L 29/08* (2006.01)
(Continued)

(52) U.S. Cl.
CPC ........ *H04L 63/1425* (2013.01); *G06F 16/951* (2019.01); *G06F 16/955* (2019.01);
(Continued)

(58) Field of Classification Search
CPC .... G06F 16/951; G06F 16/655; G06F 16/955; H04L 67/02; H04L 67/22
See application file for complete search history.

(56) References Cited

U.S. PATENT DOCUMENTS

| 7,406,627 B2 * | 7/2008 | Bailey ............... H04L 41/145 714/38.1 |
| 7,457,870 B1 | 11/2008 | Lownsbrough |

(Continued)

OTHER PUBLICATIONS

Fayazbakhsh et al., "Flowtags: Enforcing Network-Wide Policies in the Presence of Dynamic Middlebox Actions," Proceedings of the second ACM SIGCOMM workshop on Hot topics in software defined networking, HotSDN '13, Hong Kong, China, Aug. 2013, 6 pages.

(Continued)

*Primary Examiner* — Lashonda T Jacobs
(74) *Attorney, Agent, or Firm* — VanLeeuwen & VanLeeuwen; Jeffrey S. LaBaw

(57) ABSTRACT

An approach is provided that automatically classify network traffic of web applications and services based on a dynamic analysis. The approach scans a resource that corresponds to a named network application and receives, as a result of the scan, network resource identifiers that are accessed by the named network application. Network traffic between users and network resources is monitored, with the monitoring resulting in a set of visited network resource identifiers. The set of resource identifiers is found by matching the visited network resource identifiers with the network resource identifiers returned by the scan. Each of the set of resource identifiers is then matched with the named application.

17 Claims, 6 Drawing Sheets

(51) Int. Cl.
*H04L 12/26* (2006.01)
*G06F 16/951* (2019.01)
*G06F 16/955* (2019.01)

(52) U.S. Cl.
CPC .......... *H04L 43/028* (2013.01); *H04L 43/062* (2013.01); *H04L 63/1441* (2013.01); *H04L 63/20* (2013.01); *H04L 67/16* (2013.01); *H04L 67/22* (2013.01); *H04L 67/02* (2013.01)

(56) References Cited

U.S. PATENT DOCUMENTS

| | | | |
|---|---|---|---|
| 8,125,908 | B2 | 2/2012 | Rothstein |
| 8,509,071 | B1* | 8/2013 | Narayanaswamy .... H04L 47/20 370/230 |
| 8,752,173 | B2 | 6/2014 | Yadav |
| 8,990,183 | B2* | 3/2015 | Liu .................... G06Q 30/0256 707/709 |
| 9,015,844 | B1* | 4/2015 | Franklin ................ G06F 21/577 726/25 |
| 9,330,093 | B1* | 5/2016 | Chang ........................ E06B 9/15 |
| 9,436,763 | B1* | 9/2016 | Gianos .................. G06F 16/951 |
| 9,450,974 | B2 | 9/2016 | Estes |
| 9,553,895 | B2 | 1/2017 | Li |
| 9,571,511 | B2 | 2/2017 | Nelms |
| 9,853,940 | B2* | 12/2017 | Fruth ...................... H04L 63/02 |
| 10,108,801 | B2* | 10/2018 | Shema .................. G06F 21/577 |
| 2007/0208734 | A1* | 9/2007 | Koide .................... G06F 21/41 |
| 2010/0182918 | A1 | 7/2010 | Clevy |
| 2012/0167221 | A1* | 6/2012 | Kang .................... H04L 63/166 726/24 |
| 2013/0191920 | A1* | 7/2013 | Amit .................... H04L 63/166 726/25 |
| 2013/0311593 | A1* | 11/2013 | Prince .................... H04L 67/42 709/213 |
| 2013/0312102 | A1* | 11/2013 | Brake .................. G06F 21/577 726/25 |
| 2014/0081946 | A1* | 3/2014 | Choudhary ........... G06F 16/951 707/709 |
| 2014/0372847 | A1* | 12/2014 | Kreichman ......... G06F 11/3688 715/205 |
| 2016/0042070 | A1* | 2/2016 | Rossi .................... G06F 16/951 707/709 |
| 2016/0241582 | A1* | 8/2016 | Boia .................... H04L 63/1433 |
| 2017/0104829 | A1* | 4/2017 | Degroat .............. H04L 67/2833 |
| 2017/0147543 | A1* | 5/2017 | Ben-Harrush ........ G06F 16/957 |
| 2018/0191748 | A1* | 7/2018 | McGrew ........... H04L 63/1425 |
| 2019/0052666 | A1* | 2/2019 | Muthurajan ............ G06F 21/12 |
| 2019/0199742 | A1 | 6/2019 | Ionescu et al. |

OTHER PUBLICATIONS

"List of IBM Patents or Patent Applications Treated as Related," Letter dated Sep. 27, 2019, 1 page.

* cited by examiner

AUTOMATIC TRAFFIC CLASSIFICATION OF WEB APPLICATIONS AND SERVICES BASED ON DYNAMIC ANALYSIS

BACKGROUND OF THE INVENTION

Description of Related Art

Being able to automatically associate a portion of network traffic to a particular application is an aspect of monitoring the network traffic desired by network administrators as well as the management of an organization. An Enterprise organization may use this information to enforce Enterprise Access Policies. For instance, the access to a particular application may be forbidden in the Enterprise, and therefore the traffic of that application may be blocked by intrusion prevention systems (IPSs). Traditional systems use many ways to classify the network traffic into applications. The challenges posed by traditional methods, however, is that they require expert knowledge to perform the traffic-to-application mapping function. Consequently, such network traffic classification is difficult to perform by organizations that lack such expertise.

SUMMARY

An approach is provided that automatically classify network traffic of web applications and services based on a dynamic analysis. The approach scans a resource that corresponds to a named network application and receives, as a result of the scan, network resource identifiers that are accessed by the named network application. Network traffic between users and network resources is monitored, with the monitoring resulting in a set of visited network resource identifiers. The set of resource identifiers is found by matching the visited network resource identifiers with the network resource identifiers returned by the scan. Each of the set of resource identifiers is then matched with the named application.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
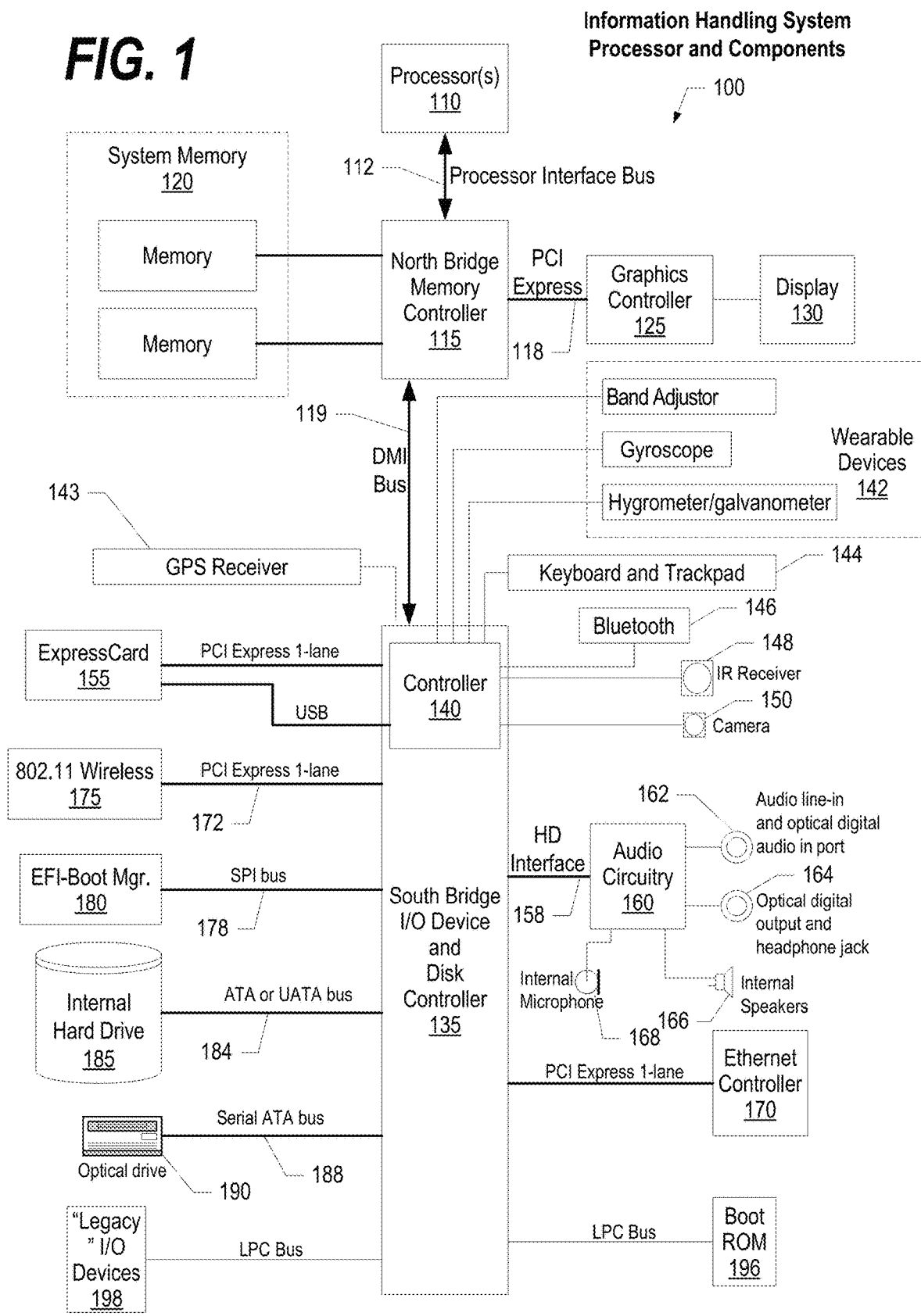
FIG. 1 depicts a block diagram of a data processing system in which illustrative embodiments may be implemented.

FIGS. 1-6 show an approach that automatically identifies a web application or a web service. A network device uses information collected during a Web Crawl or a Dynamic Analysis Scan. When a Dynamic Analysis Scan is performed, the website (or web service) is first explored, and then tested for security flaws. Therefore, at the end of a Dynamic Analysis scan there is a set of Visited URLs discovered by the scan. Similarly, while not exposing security flaws, a web crawl of a site or service also discovers URLs visited by the site. The approach excludes the "host" of the collected URLs, resulting in a set of URLs that describe the traffic of a particular application. In addition, the name of the application is also known by the person who conducts the Dynamic Scan or web crawl.

This information <application metadata (including the name), <set of URLs>> is collected for each Dynamic Scan and web crawl and is sent over to a network device. The network device uses this information to identify and automatically tag the current traffic through the device. The network device can also use this information to tag historical information has already been collected.

Dynamic Analysis scans are usually performed in Pre-Production and in closed environments, while the network devices operate with live traffic. The approach described herein operates under these restrictions since it is only the "host" that will be different in these cases, and that host will be excluded from the analysis. In contrast, web crawls are often performed on web sites that have been deployed and are in production. While not collecting the extensive information collected by a Dynamic Analysis scan, a web crawl scan does return the URLs visited while crawling the web site. In addition, in some jurisdictions performing a Dynamic Analysis on a third-party's site might be illegal, limiting use of the Dynamic Analysis to sites that are owned by the organization or to those sites that the organization has the legal right to perform such scans, such as through contractual arrangements.

The approach first performs a Dynamic Analysis scan or a web crawl on all the Web Applications of interest to the organization. Second, the approach collects the application metadata and the visited URLs from the Dynamic analysis scans and web crawls. Third, the data is pushed to a network device. Finally, the live traffic is categorized and tagged with the associated application. In addition, network devices can be configured to block access to particular applications, such as social media applications, and these applications will then be blocked from access within the organization by the categorized traffic that is associated with such social media applications.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
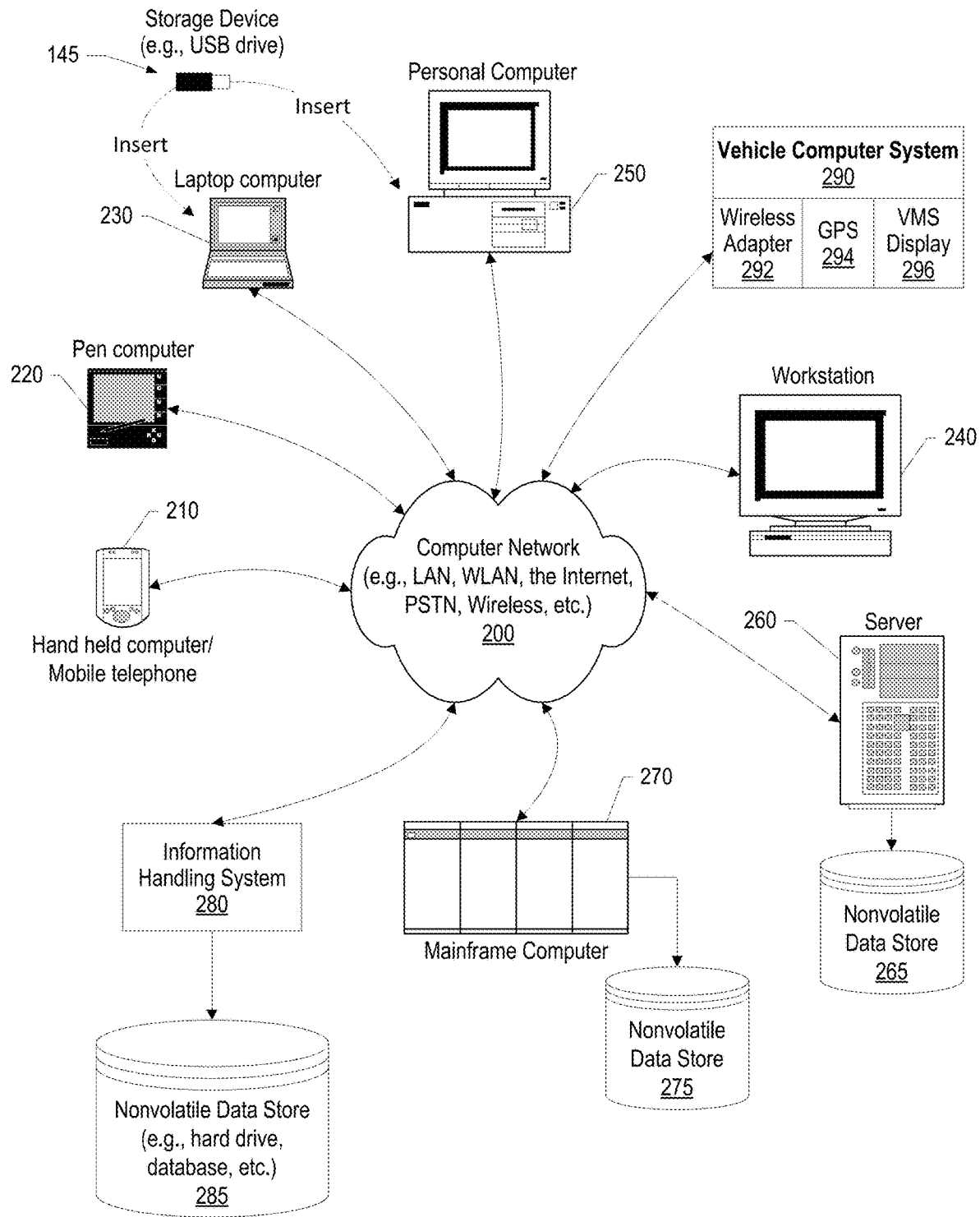
FIG. 2 depicts a block diagram of network of information handling systems as shown in FIG. 1 in which illustrative embodiments may be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
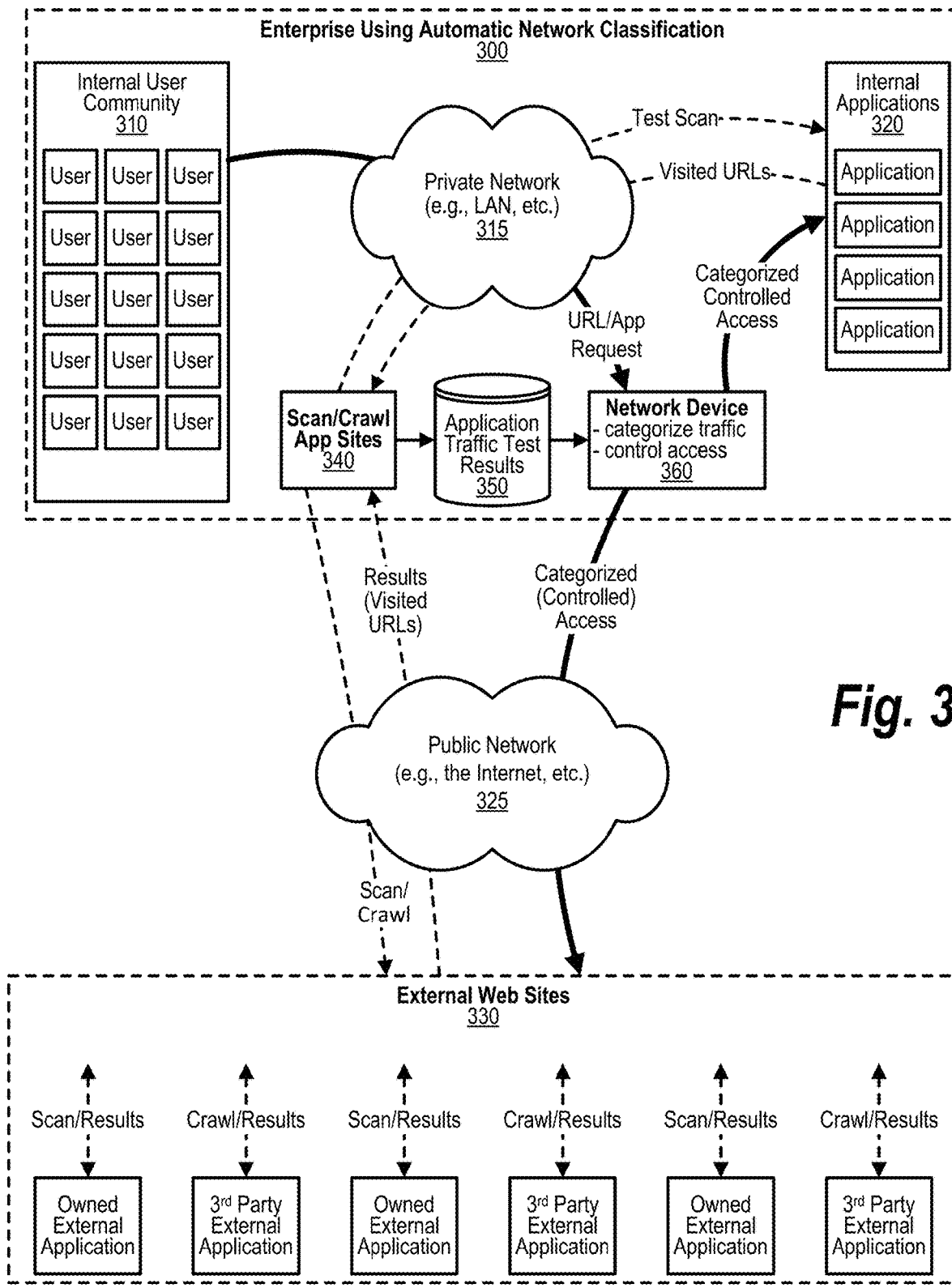
FIG. 3 depicts a diagram of components used to automatically classify network traffic of web applications and services based on a dynamic analysis.

FIG. 3 depicts a diagram of components used to automatically classify network traffic of web applications and services based on a dynamic analysis. Enterprise organization 300 is an organization that is using automatic network classification to classify network traffic to and from the organization. User community 310 are users within the organization, such as employees and the like. Organization 300 has internal applications 320 accessible by users 310 with internal applications being accessible without needing to access computer network 325, such as the Internet. An organization's payroll system, accounts receivable system, accounts payable system, etc. might be examples of internal applications 320. These systems are network resources that correspond to a named network application. For example, the network identifier, or address, of the payroll application would correspond to the named network application "payroll," the network identifier of the accounts payable application would correspond to the named network application "accounts payable," and the like. In one embodiment, internal applications 320 can include both organization-owned network applications as well as third-party network applications, where the third party network applications are owned by a different organization or individual and not by the organization. Internal applications 320 that are third-party network applications might be licensed by the organization to install on the organization's computer systems in order to be accessed and used by the organization's user community 310. Internal applications 320 are accessed by internal user community 310 via private computer network 315, such as a local area network (LAN) implemented and owned by the organization.

External web sites 330 are network resources accessible by user community 310 by way of computer network 325, such as the Internet. External websites also might include both organization-owned network applications as well as third-party network applications. External web sites, or services, might be used to host one or more of the organization-owned network applications. In addition, other offices of the organization might host organization-owned network applications for use by the organization's user community with some of the users accessing such applications from different offices and, thus, utilizing computer network 325 for such access. For example, internal applications 320 might be accessible by the organization's users located at different sites with these users accessing applications 320 via computer network 325 so, to these external users, applications 320 would be perceived as external applications that are either organization-owned network applications or are network applications that are owned by third-parties.

Process 340 scans a list of named network applications with the scan resulting in network resource identifiers (e.g., URLs, etc.) that were accessed by the named network applications. In one embodiment, a Dynamic Analysis Scan is performed on named network applications that are owned by the organization (organization-owned network applications), while a web crawl is used to scan third-party network applications. In some jurisdictions, a Dynamic Analysis Scan might be an illegal access of a network resource that is not owned by the organization. In addition, due to the nature of accesses occurring during a Dynamic Analysis Scan, the scan might be identified as a possible "attack" on the web site, resulting in the web site deploying various measures to resist or otherwise thwart the perceived attack, including rejecting requests from the network resource that is conducting the scan. In this embodiment, a web crawler application is used to scan the named network applications. Both the Dynamic Analysis Scan (performed on organization-owned network applications) and web crawling (performed on third-party network applications) result in application traffic test results that are stored in data store 350. The application traffic test results includes the network resource identifiers (e.g., URLs, etc.) that were accessed by the named network application during the scan.

Network device 360 is used to facilitate and monitor network traffic between the organization's user community 310 and the network resources accessed by the users. As shown herein, network device 360 utilizes the application traffic test results to associate the network resources (e.g., URLs, etc.) found in the network traffic with the named network application that corresponds to the network resources.

Figure 4:
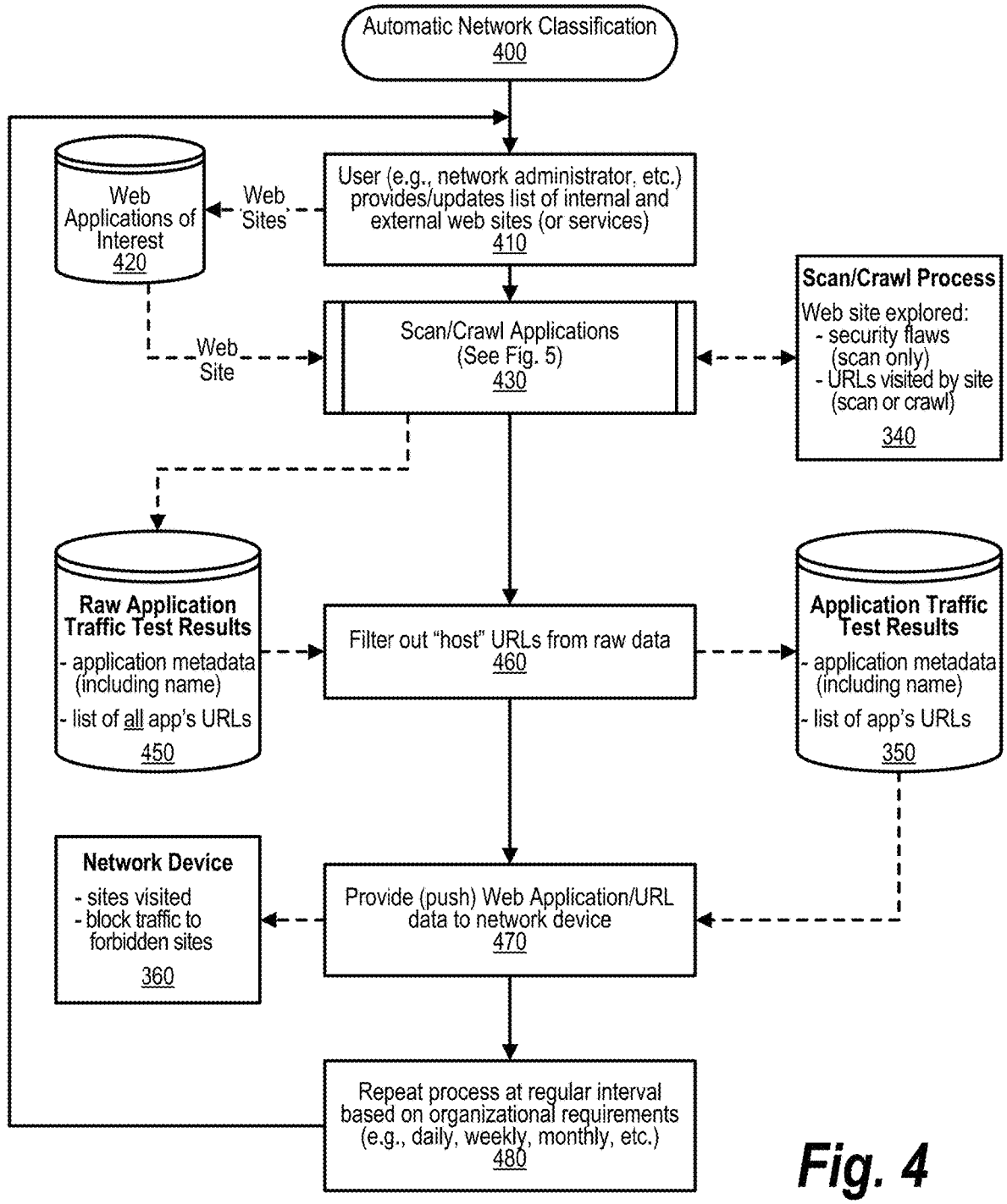
FIG. 4 depicts a flowchart showing the steps taken to automatically classify network traffic.

FIG. 4 depicts a flowchart showing the steps taken to automatically classify network traffic. FIG. 4 processing commences at 400 and shows the steps taken by a process that performs automatic network classification. At step 410, a user, such as a network administrator, etc., provides or updates a list of internal and external web sites (or services) with this list being a list of named network applications. In one embodiment, the user also indicates those network applications that are organization-owned network applications and those applications that are third-party network applications. The list of named applications is stored in data store 420. At predefined process 430, the process performs the Scan/Crawl Applications routine (see FIG. 5 and corresponding text for processing details). As shown, predefined process 430 scans each of the named applications listed in data store 420 using either a Dynamic Analysis scan or a web crawl process.

The raw application test results are stored in data store 450 with the raw results including the application metadata (the named network application) associated with each of the URLs that were visited by the corresponding named network application during the scan. At this point, the network resource data (the URL) includes the entire URL. At step 340, the scan/crawl process explores each of the network applications listed in data store 420. The scan can return security flaws found in a named application when a Dynamic Analysis scan is performed. The network resources (URLs) that are visited by each of the network applications are also returned from the scan with either a Dynamic Analysis Scan or a web crawl returning the network resources that were visited.

At step 460, the process filters out the "host" network resource identifier from the full network resource identifier, thus leaving the portion of the network resource identifier that does not have the host name. A website (named network application) can be deployed anywhere in the public network, for example a proprietary web application can be deployed in twenty different servers in the company. The server (host) name is of no importance, however, being the same named network application, the relative paths included in the URLs will always be the same. For example, the following show seven different host names being used for the same named network application, so each of these seven URLs will be associated with the same host name despite their differences:

https://Server1.com/appXPath//isam/oidc/endpoint/
  amapp-runtime-oidcidp/
  authorize?response_type=code;
https://Server2.com/appXPath//isam/oidc/endpoint/
  amapp-runtime-oidcidp/
  authorize?response_type=code;
https://Server3.com/appXPath//isam/oidc/endpoint/
  amapp-runtime-oidcidp/
  authorize?response_type=code;

https://Server4.com/appXPath//isam/oidc/endpoint/
   amapp-runtime-oidcidp/
   authorize?response_type=code;
https://Server5.com/appXPath//isam/oidc/endpoint/
   amapp-runtime-oidcidp/
   authorize?response_type=code;
https://Server6.com/appXPath//isam/oidc/endpoint/
   amapp-runtime-oidcidp/
   authorize?response_type=code; and
https://Server7.com/appXPath//isam/oidc/endpoint/
   amapp-runtime-oidcidp/
   authorize?response_type=code.

The key here is that the approach identifies, based on the traffic, which application resides at which location. It is likely that the scan is done on a pre-production website, in which case the scan might be performed on: https://vioserver1.ca/appXPath//isam/oidc/endpoint/amapp-runtime-oidcidp/authorize?response_type=code. However, the actual production website would be at a different location (not vioserver1.ca).

The network resources accessed by a named network application often have many different relative paths which essentially becomes a sort of "signature" of the named network application. Using a social media example, assume that "socialmedia.com" is an named network application that the organization owns, and this application is likely to be deployed on multiple servers. Then, based on "https://www.socialmedia.com/joe.vanleeuwen1/friend-s?lst=156641396
   1%3A1566413961%3A1510849690&source_ref=
   pb_friends_tl"
step 460 removes the server, resulting in:
<PLACEHOLDER>/joe.vanleeuwen1/
   friends?lst=1566413961%3A156
   6413961%3A1510849690&source_ref=pb_friends_tl and based on this result, the system can ascertain which traffic in the enterprise is directed to or from the social media site, such as:
   http://testsiteno1.com/joe.vanleeuwen1/
      friends?lst=1566413961%3A15
      66413961%3A1510849690&source_ref=pb_friends_tl With this example, we might assume that on the server testsiteno1.com the organization has an active deployment of the "socialmedia" website. The result of the filtering performed at step 460 is the named network application metadata and all of the network resource identifiers (URLs) associated with the named network application without the server (host) information. This filtered set of Application Traffic Test Results are stored in data store 350. At step 470, the process provides (e.g., "pushes", etc.) the named network application and associated network resource identifiers to a network device, such as network device 360. At step 480, the process repeats the process described above at regular interval based on the organization's requirements. For example, the process could be performed daily, weekly, monthly, etc., as determined by the organization.

Figure 5:
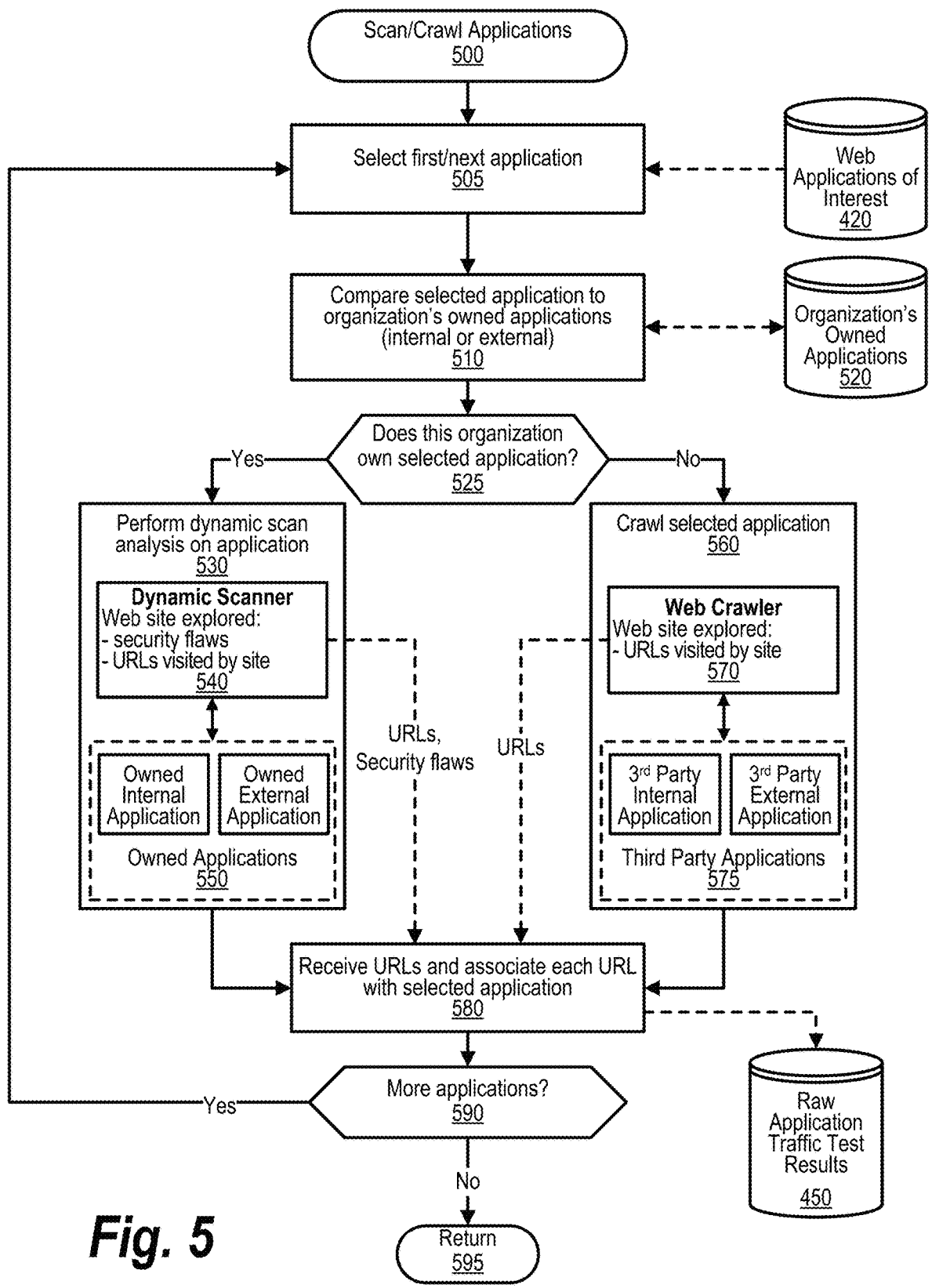
FIG. 5 depicts a flowchart showing details of a process that scans web applications for the URLs that are visited by the applications.

FIG. 5 depicts a flowchart showing details of a process that scans web applications for the URLs that are visited by the applications. FIG. 5 processing commences at 500 and shows the steps taken by a process that scans named network applications. At step 505, the process selects the first named network application from data store 420. At step 510, the process compares the selected named network application to a list of the organization's owned applications (internal or external). The list of the organization-owned named network applications are retrieved from data store 520. The process determines, based on the comparison, whether the organization owns, or otherwise has the right, to perform a Dynamic Analysis scan on the selected named network application (decision 525). If the organization is allowed to perform a Dynamic Analysis scan on the selected named network application, then decision 525 branches to the 'yes' branch to perform the Dynamic Analysis scan at step 530. On the other hand, if the organization is not allowed to perform a Dynamic Analysis scan on the selected named network application, then decision 525 branches to the 'no' branch to perform a web crawler process scan at step 560.

At step 530, the process performs a Dynamic Analysis Scan on the selected named network application using Dynamic Analysis Scanner 540 that results in discovery of security flaws of the named network application as well as the network resource identifiers (URLs) visited by the named network application. The Dynamic Scanner scans organization-owned named network applications and avoids scanning third-party applications.

If the selected application is not an organization-owned named network application, then at step 560, the process uses web crawler process 570 to scan the selected application and return the network resource identifiers (URLs) visited by the application. As discussed above, while a Dynamic Analysis Scan returns more data about the application, such a scan is often not allowed when dealing with a third party's application. Therefore, third-party named network applications 575 are scanned using web crawler process 570 with the web crawler process returning the network resource identifiers visited by the third-party applications.

At step 580, the process receives the network resource identifiers (URLs) and associates each of these identifiers with the selected named network application. This data is stored in raw application test results that are stored in data store 450. The process determines whether there are more named network applications listed in data store 420 to select and process as described above (decision 590). If there are more applications to process, then decision 590 branches to the 'yes' branch which loops back to step 505 to select and process the next named network application as described above. This looping continues until there are no more named network applications to process, at which point decision 590 branches to the 'no' branch exiting the loop and processing returns to the calling routine (see FIG. 4) at 595.

Figure 6:
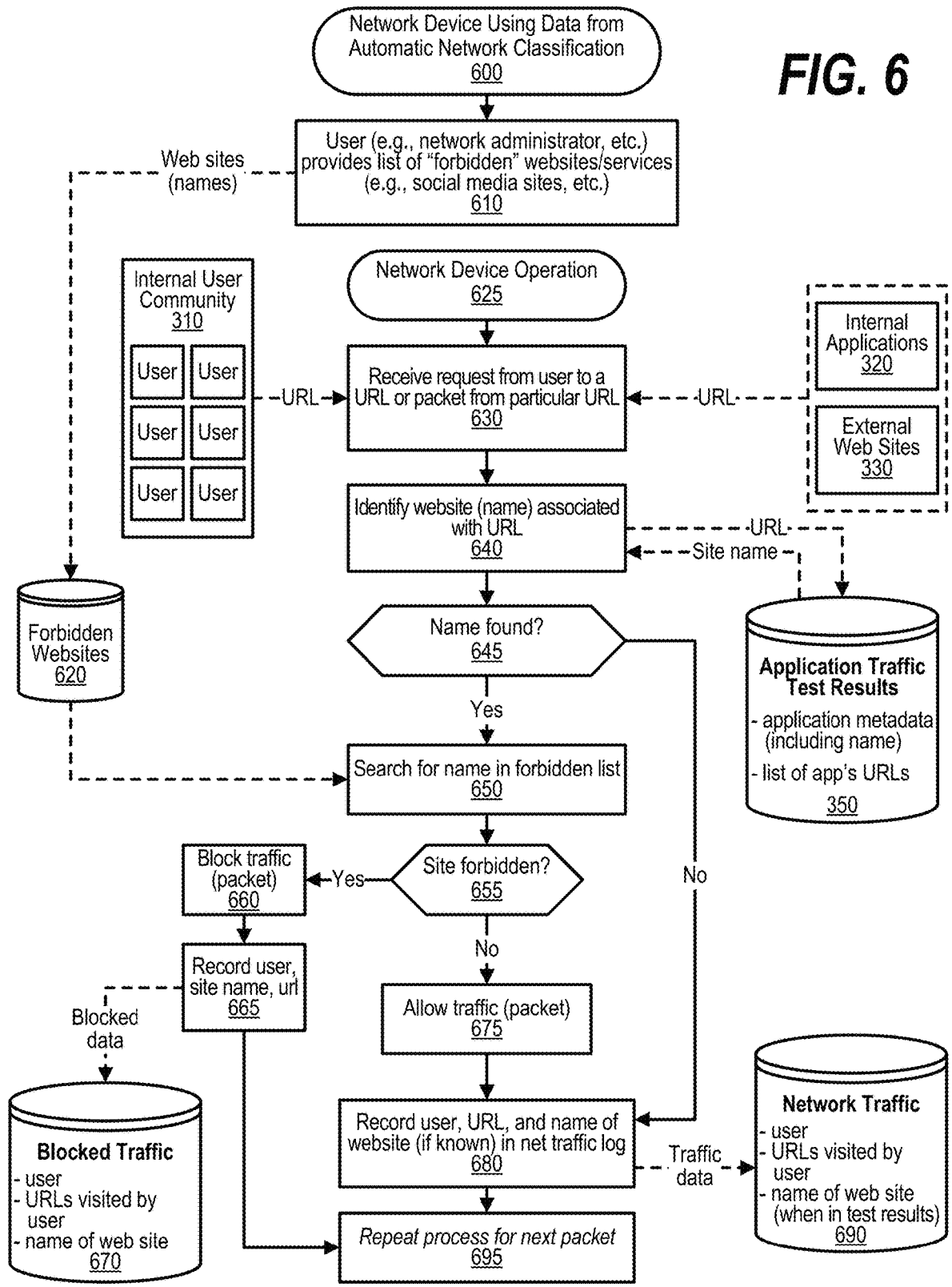
FIG. 6 depicts a flowchart showing details of processes operate network devices using automatic network classification data.

FIG. 6 depicts a flowchart showing details of processes operate network devices using automatic network classification data. Processing commences at 600 whereupon, at step 610, the process receives a list of any "forbidden" named network applications that users in the organization are not allowed to access, such as a social media site. This list of "forbidden" named network applications is stored in data store 620.

Network device operation commences at 625 whereupon, at step 630, the process receives a request from a user that is a member of user community 310 with the request relating to a network resource identifier (URL) and can be either reception of a data packet from a network resource identifier or transmission of a data packet to a network resource identifier. The network resource identifier can be to or from internal applications 320 (e.g., organization-owned applications) as well as to or from external applications 330 (applications accessed via a public network such as the Internet).

At step 640, the process identifies the named network application that is associated with the network resource identifier from step 630. This identification is performed by retrieving the named network application that matches a portion of the network resource identifier (URL) with the information being stored in data store 350. The process determines as to whether the named network application was found in data store 350 (decision 645). If the named network application was found, then decision 645 branches to the 'yes' branch to perform steps 650 through 675. On the other hand, if the named network application was not found, then decision 645 branches to the 'no' branch bypassing steps 650 through 675.

Steps 650 through 675 are performed when a match occurred in decision 645. At step 650, the process searches for the name of the named network application in forbidden list 620. Based on the search, the process determines whether the named network application is forbidden (decision 655). If the named network application is forbidden, then decision 655 branches to the 'yes' branch to perform steps 660 and 665. On the other hand, if the named network application is not forbidden, then decision 655 branches to the 'no' branch to perform steps 675 and 680.

If the network resource identifier is associated with a forbidden named network application then steps 660 and 665 are performed. At step 660, the process blocks the traffic (packet), thus preventing access to or data from the forbidden application. At step 665, the process records the user that made the request that was blocked along with the name of the forbidden named network application as well as the network resource identifier (URL).

If the network resource identifier is not associated with a forbidden named network application, then steps 675 and 680 are performed. At step 675, the process allows the traffic (packet) to or from the user. At step 680, the process records the user along with the network resource identifier (URL) and the name of the named network application (if found in data store 350) in the network traffic log that is stored in data store 690. Data store is a log of the monitoring of the network traffic between users and internal and external applications with the log including the user identifiers, the network resource identifiers (URLs) visited by each of the users, as well as the name (if known) of each of the named network applications visited by each of the users. At step 695, the process is repeated for the next packet by looping back to step 630 when another request or data packet is received.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
    scanning a plurality of network resources corresponding to a plurality of named network applications, wherein the scanning comprises scanning a first set of network resources using a first type of scan and scanning a second set of network resources using a second type of scan;
    receiving, as a result of the scanning, a first plurality of network resource identifiers accessed by a first named network application corresponding to a first network resource;
    monitoring network traffic between a plurality of users and the plurality of network resources, wherein the monitoring results in a second plurality of network resource identifiers;
    identifying a set of resource identifiers by matching the second plurality of network resource identifiers with one or more of the first plurality of network resource identifiers;
    associating each of the set of resource identifiers with the first named network application;
    receiving one or more restricted application names that correspond to the first named network application; and
    dynamically blocking the network traffic between the plurality of users and the first named network application.

2. The method of claim 1 further comprising:
    filtering out a host data area from each of the first and second pluralities of network resource identifiers, wherein the matching is performed on the filtered first and second pluralities of network resource identifiers.

3. The method of claim 1 wherein the first type of scan comprises a dynamic scan analysis and the second type of scan comprises a web crawler application.

4. The method of claim 1 further comprising:
    receiving, as a result of the scanning, a plurality of sets of different first plurality network resource identifiers wherein each of the sets is associated with a different one of the plurality of named applications;
    identifying a matching set of resource identifiers by matching the second plurality of network resource identifiers with one or more of the first plurality of network resource identifiers; and
    associating each of the matching set of resource identifiers with one of the named applications that corresponds to the matched one of the first plurality of network resource identifiers.

5. The method of claim 4 wherein the monitoring further comprises:
    tagging each of the matched second plurality of network resource identifiers with the name of the corresponding named application.

6. The method of claim 4 further comprising:
sending the first named network application, the plurality of sets of the different first plurality of network resource identifiers, and the restricted application names to a network device, wherein the monitoring and dynamic blocking is performed by the network device.

7. An information handling system comprising:
one or more processors;
a network adapter that connects the information handling system to a computer network;
a memory coupled to at least one of the processors; and
a set of computer program instructions stored in the memory and executed by at least one of the processors in order to perform actions comprising:
  scanning a plurality of network resources corresponding to a plurality of named network applications, wherein the scanning comprises scanning a first set of network resources using a first type of scan and scanning a second set of network resources using a second type of scan;
  receiving, as a result of the scanning, a first plurality of network resource identifiers accessed by a first named network application corresponding to a first network resource;
  monitoring network traffic between a plurality of users and the plurality of network resources, wherein the monitoring results in a second plurality of network resource identifiers;
  identifying a set of resource identifiers by matching the second plurality of network resource identifiers with one or more of the first plurality of network resource identifiers;
  associating each of the set of resource identifiers with the first named network application;
  receiving one or more restricted application names that correspond to the first named network application; and
  dynamically blocking the network traffic between the plurality of users and the first named network application.

8. The information handling system of claim 7 wherein the actions further comprise:
filtering out a host data area from each of the first and second pluralities of network resource identifiers, wherein the matching is performed on the filtered first and second pluralities of network resource identifiers.

9. The information handling system of claim 7 wherein the first type of scan comprises a dynamic scan analysis and the second type of scan comprises a web crawler application.

10. The information handling system of claim 7 wherein the actions further comprise:
receiving, as a result of the scanning, a plurality of sets of different first plurality network resource identifiers wherein each of the sets is associated with a different one of the plurality of named applications;
identifying a matching set of resource identifiers by matching the second plurality of network resource identifiers with one or more of the first plurality of network resource identifiers; and
associating each of the matching set of resource identifiers with one of the named applications that corresponds to the matched one of the first plurality of network resource identifiers.

11. The information handling system of claim 10 wherein the monitoring further comprises:
tagging each of the matched second plurality of network resource identifiers with the name of the corresponding named application.

12. The information handling system of claim 10 wherein the actions further comprise:
sending the the first named network application, the plurality of sets of the different first plurality of network resource identifiers, and the restricted application names to a network device, wherein the monitoring and dynamic blocking is performed by the network device.

13. A computer program product stored in a computer readable storage medium, comprising computer program code that, when executed by an information handling system, performs actions comprising:
  scanning a plurality of network resources corresponding to a plurality of named network applications, wherein the scanning comprises scanning a first set of network resources using a first type of scan and scanning a second set of network resources using a second type of scan;
  receiving, as a result of the scanning, a first plurality of network resource identifiers accessed by a first named network application corresponding to a first network resource;
  monitoring network traffic between a plurality of users and the plurality of network resources, wherein the monitoring results in a second plurality of network resource identifiers;
  identifying a set of resource identifiers by matching the second plurality of network resource identifiers with one or more of the first plurality of network resource identifiers;
  associating each of the set of resource identifiers with the first named network application;
  receiving one or more restricted application names that correspond to the first named network application; and
  dynamically blocking the network traffic between the plurality of users and the first named network application.

14. The computer program product of claim 13 wherein the actions further comprise:
filtering out a host data area from each of the first and second pluralities of network resource identifiers, wherein the matching is performed on the filtered first and second pluralities of network resource identifiers.

15. The computer program product of claim 13 wherein the first type of scan comprises a dynamic scan analysis and the second type of scan comprises a web crawler application.

16. The computer program product of claim 13 wherein the actions further comprise:
receiving, as a result of the scans, a plurality of sets of different first plurality network resource identifiers wherein each of the sets is associated with a different one of the plurality of named applications;
identifying a matching set of resource identifiers by matching the second plurality of network resource identifiers with one or more of the first plurality of network resource identifiers; and
associating each of the matching set of resource identifiers with one of the named applications that corresponds to the matched one of the first plurality of network resource identifiers.

17. The computer program product of claim 16 wherein the actions further comprise:
 sending the the first named network application, the plurality of sets of the different first plurality of network resource identifiers, and the restricted application names to a network device, wherein the monitoring and dynamic blocking is performed by the network device.

* * * * *